United States Patent Office 3,036,485
Patented May 29, 1962

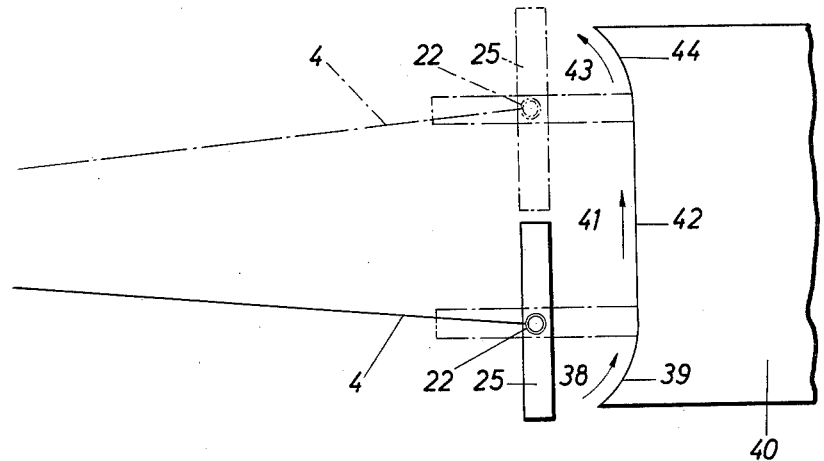
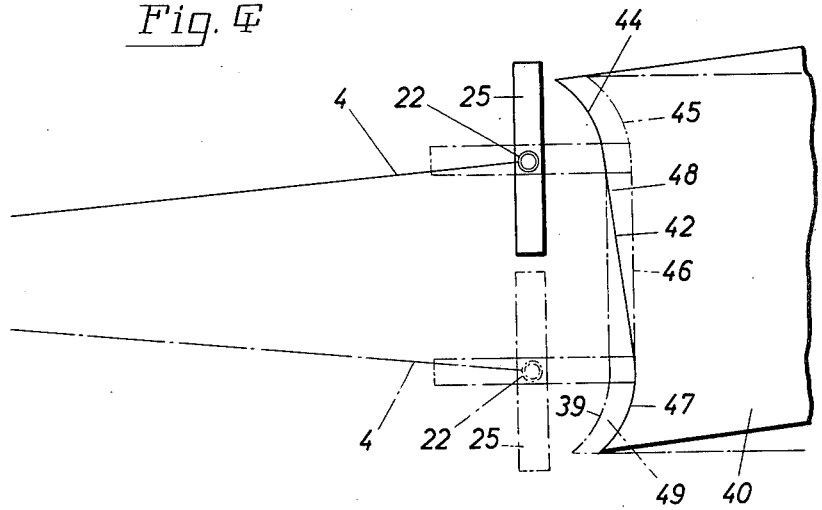

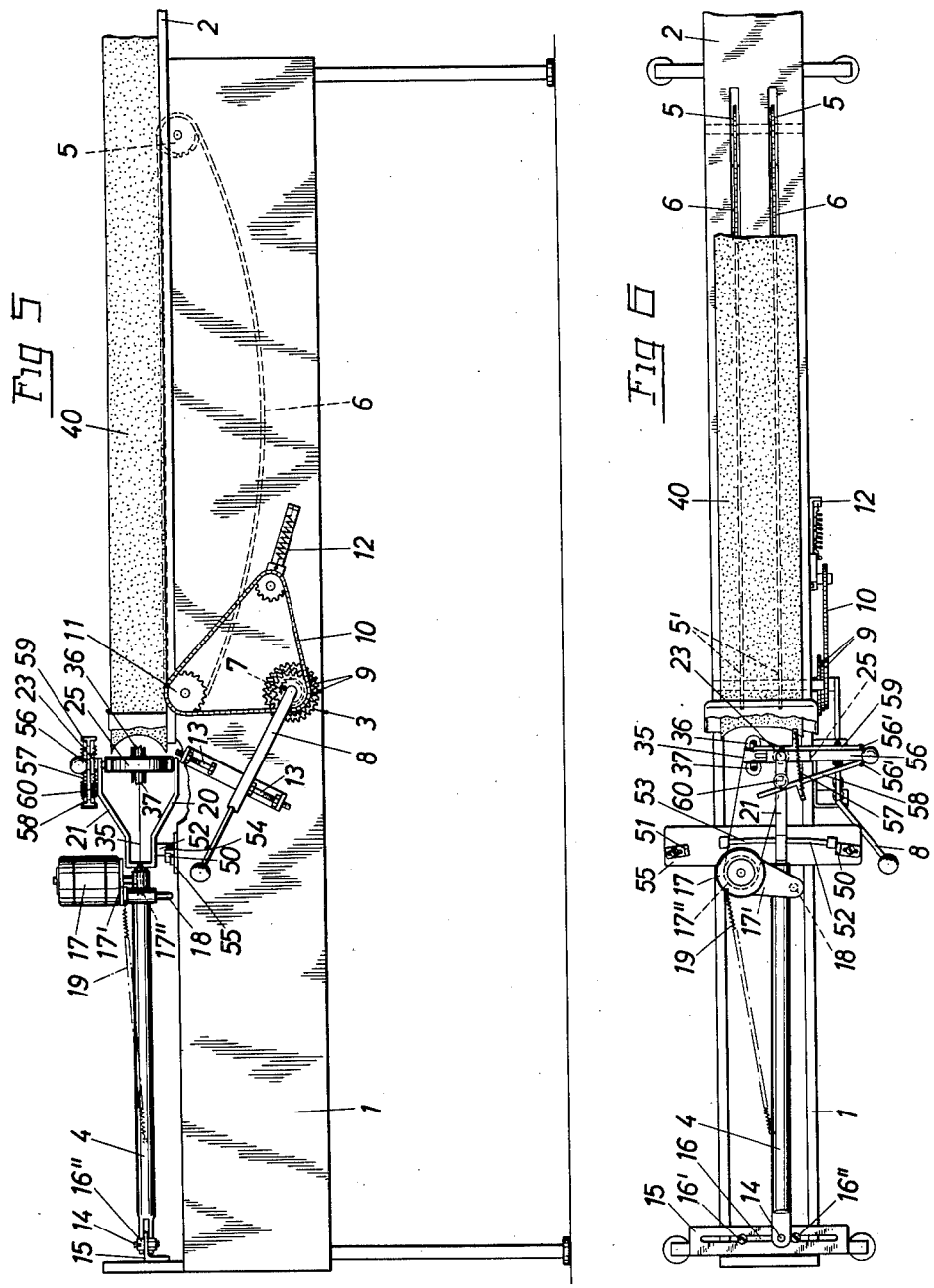

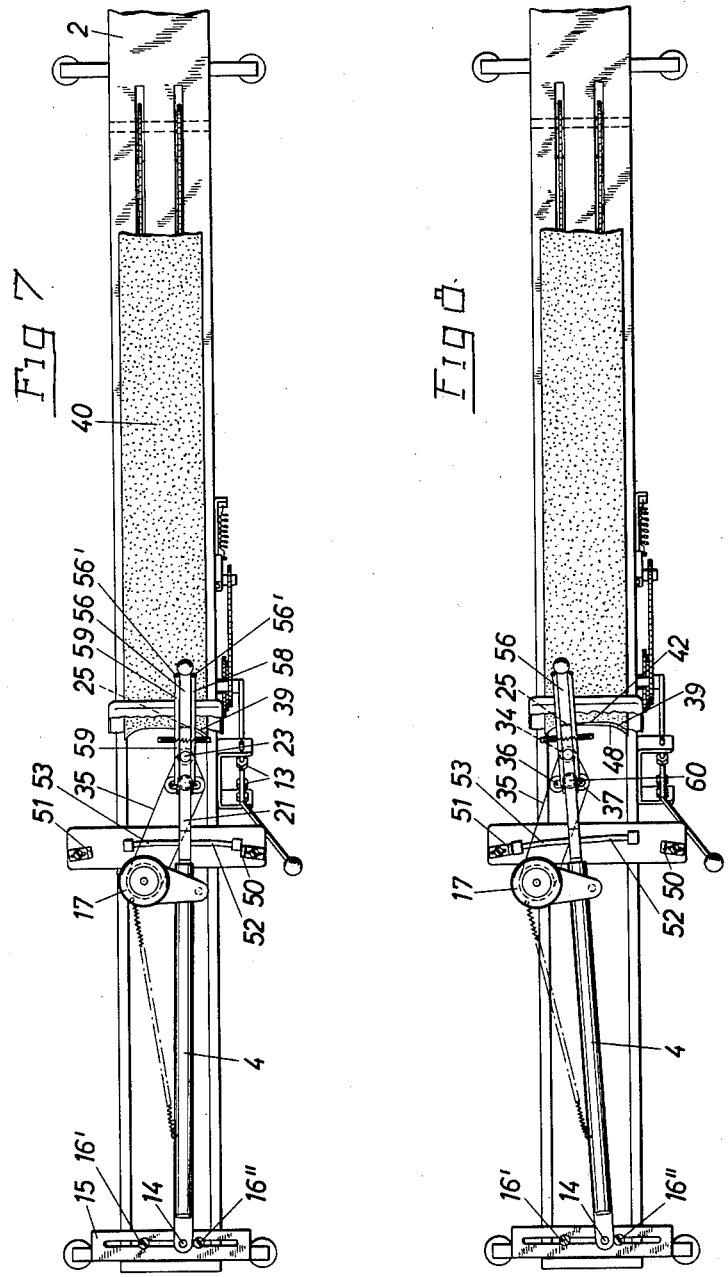

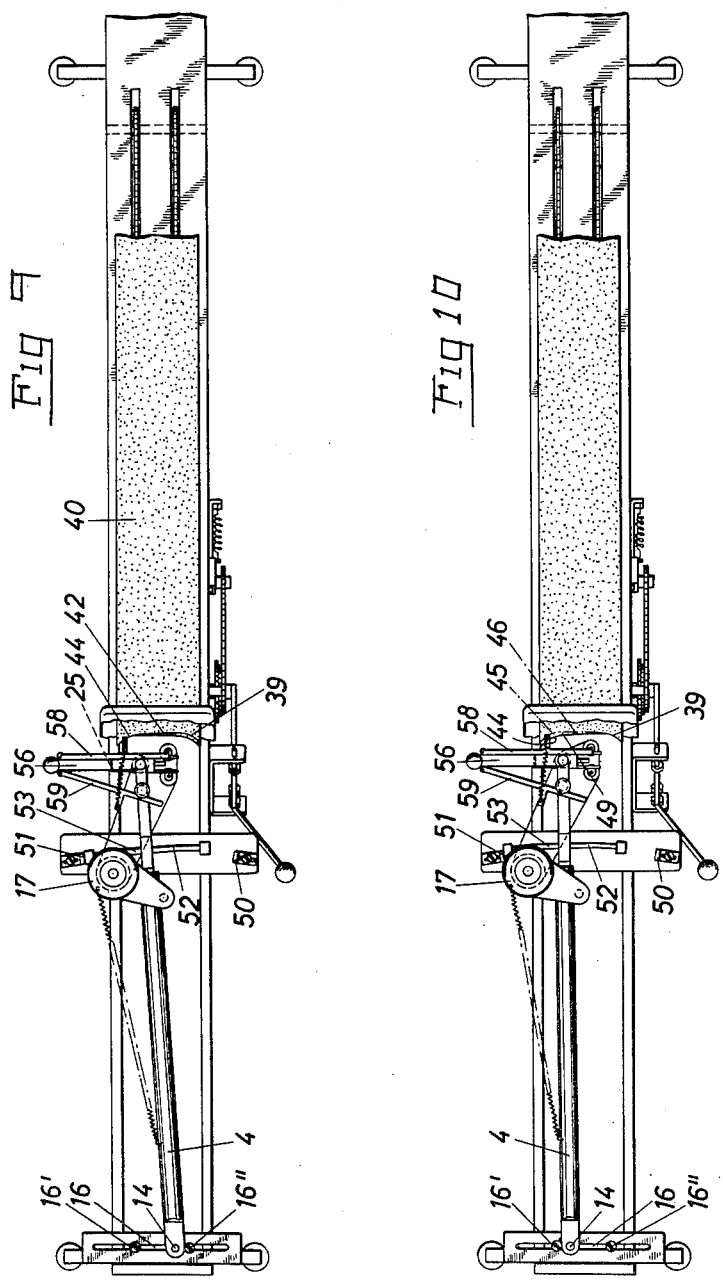

3,036,485
MACHINE FOR CUTTING OUT FORM PIECES, IN PARTICULAR SHOULDER PADS FROM A BLOCK OF MATERIAL
Walter Pottmann, Strohgasse 10, Linz (Rhine), Germany
Original application Sept. 9, 1957, Ser. No. 682,877. Divided and this application Dec. 2, 1958, Ser. No. 777,783
Claims priority, application Germany Dec. 7, 1956
4 Claims. (Cl. 83—248)

The present invention relates to a machine for cutting out form pieces, particularly shoulder pads, from a block of material.

This is a divisional application of the co-pending patent application Serial No. 682,877, filed September 9, 1957.

Machines are known for cutting out of form pieces from the end face of the step-wise advanced block of material with a single cutting stroke. If, however, these form pieces have a plurality of curved lines on their faces which are angularly disposed relative to each other, the problem occurs to cut such form pieces with a single cutting stroke.

It is, therefore, one object of the present invention to solve this problem by giving the cutting tool the shape of one of the curves of the form pieces to be cut and to guide the cutting tool through the block of material along a curved line corresponding to and complementary to the other curved line disposed crosswise to the first curved line.

It is another object of the present invention to provide a machine for cutting out form pieces from a block of material which comprises a forked head movable in a plane and the legs of the forked head carry axles extending crosswise to the moving plane, the axles supporting a double-edged band knife which projects in a curved shape and which is subjected to an oscillating drive, the cutting edges of the knife being disposed opposite each other in the moving direction of the forked head.

Due to this structure, it is made possible that the knife is guided along a cutting path through the material block which consists of curves having curve radii of different sizes, the knife already producing a curved cut due to its curved shape. It is merely necessary to swing for instance the band knife at the beginning and at the end of each cutting step for an angle in the direction of stroke section, while a differently shaped cutting path is formed on the intermediate piece between these two movements, by moving the fork head itself.

It is still another object of the present invention to provide a machine for cutting out form pieces from a block of material, and in particular the formation of different curved shapes of the band knife, by oscillating the band knife along a slide member, the ends of which sit on the axle of the forked head.

It is also another object of the present invention to provide a machine for cutting out form pieces from a block of material, wherein a constructively simple and exactly adjustable arrangement is provided in order to realize one of the curved cutting paths in such a manner that one end of the swinging arm is formed to a fork, the legs of which are disposed in a plane arranged perpendicularly to the moving plane of the swinging arm, and the ends of the legs are formed as bearings for an axle carrying the cutting tool with its drive.

Due to this formation, the forked head describes during its movement a circular path in the plane permitting its movement, the radius of the circular path corresponding with the length of the swinging arm. This movement of the forked head along a circular path may then be superimposed with the circular path, which may be followed by the knife due to arrangement on the crosswise disposed axis of the forked head.

The operation of the swinging arm including the axle of the pivot head is simplified in an advantageous manner by extending one end of the axle beyond the bearing, in order to provide attachment of a control member. If this control member is formed as a hand gripping member, it permits the movement with the forked head therewith, as well as the rotary movement of the axle disposed in the forked head, which axle carries the knife which projects in a curved shape.

With these and other objects in view, which will become apparent in the following detailed description, the present invention will be clearly understood in connection with the accompanying drawings, in which:

FIGS. 3 and 4 are schematic showings of the movement of the cutting tool in two different working conditions;

FIG. 5 is a side elevation of the machine equipped with a forked head, as disclosed in FIG. 2, with a cross position of the band knife;

FIG. 6 is a top plan view of the machine shown in FIG. 5;

FIG. 7 is a top plan view of the machine after a curved section path of the band knife;

FIG. 8 is a top plan view of the machine upon complete cut of the shoulder pad;

FIG. 9 is a top plan view of the machine with opposite cross position of the band knife; and FIG. 10 is a top plan view of the machine upon adjustment of the pivot point of the swing arm.

Figure 1:
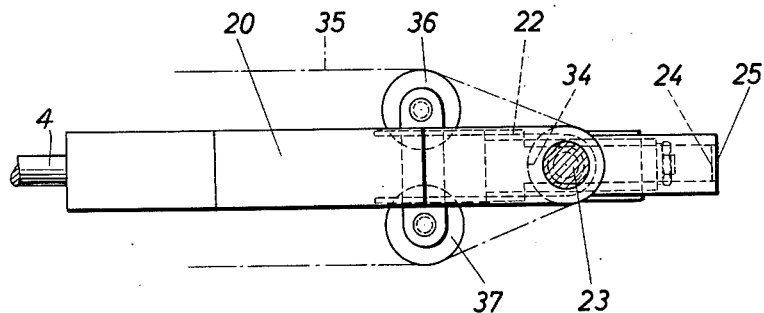
FIGURE 1 is a side elevation of the swinging arm equipped with a pivot head.
Figure 2:
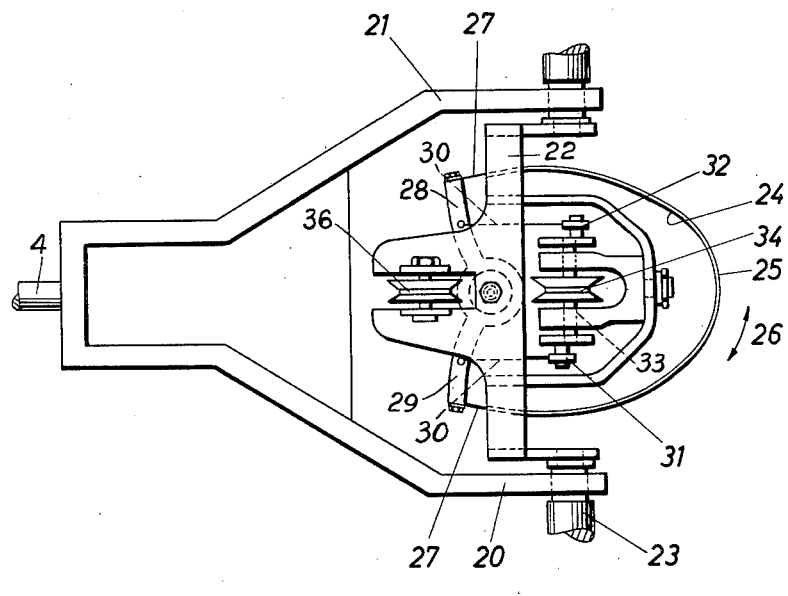
FIG. 2 is a top plan view of the swinging arm equipped with a pivot head.

Referring now to the drawings, the machine comprises a frame 1 which carries the table 2 serving the feeding of the block of foamy material, the advance drive 3 and a swing arm 4, which supports at its free end, disposed opposite the block of foamy material, the forked head formed by the arms 20 and 21.

The feed-drive 3 includes the turning gears 5 and 5', the endless conveyor chains 6 running over the gears 5 and 5' projecting above the plane of the table 2 slightly and feed the block of foamy material during their movement toward the band knife. The operation of the turning gear 5 is brought about intermittently by means of a ratchet wheel 7 which drives the gears 9 with the operating lever 8. The rotary drive is transmitted to another gear 11 by means of the chain 10 and, thereby, to the turning gears 5' keyed to the same shaft which carries the gear 11. The operating lever 8 moves between the abutment screw 13 and is moved upwardly and again downwardly upon cutting of one form piece.

The swinging arm 4 is mounted on a bolt 14, which is manually movable in a guide slot 16 provided in a plate 15 disposed on one end of the frame 1. The displacement of the pivot point of the swinging arm 4 in the respective cutting positions is achieved by means of adjustable abutments 16' and 16'' and the bolt 14 is manually retained in these positions. Furthermore, the swinging arm 4 carries also an electric motor 17 adapted for driving the band knife 25. The electric motor 17 is supported on a swinging arm 17' pivotally mounted on the pin 18 and subjected to the effect of a tension spring 19. A rope drive 35 runs over the disc 17'', keyed to the motor axle, the roller 34 and the turning rollers 36 and 37.

The swinging movement of the swinging arm 4 is limited by the abutment members 50 and 51 which are engaged by the abutment arms 52 and 53 provided on the forked head. The abutment arms 52 and 53 support the entire swinging arm 4 and have sliding rollers 54, which slide on a supporting plate 55 mounted on the frame 1.

The end 23 of the axle 22 mounted in the arms 20 and 21 projects upwardly and carries a handle 56. The latter has at one end rods 58 and 59 pivotally mounted on the bolt 56', which rods 58 and 59 are pulled towards a supporting pin 60 by means of the tension springs 57.

The end of the axle 23 extends between the rods 58 and 59. The arrangement of the rods 58 and 59 on the handle 56 in a spring-biased manner causes the effect that the band knife 25 disposed on the same axle 22 of the handle 56 is retained stable during the swinging of the swinging arm 4 upon its pivot point 14 up to a predetermined cross pressure (FIG. 8), then, however, due to the abutment on one of the abutment members 50 and 51 swings this band knife 25 through the handle 56 and performs a corresponding curved section.

The operation of the machine is performed in the following manner:

The electric motor 17 rotatably mounted upon the pin 18 on the swinging arm 4 causes an oscillating movement along the double arrow 26 of the band knife 25 running on the cradle-like slide 24 by means of the rope drive 35.

For this purpose, the ends 27 of the band knife 25 are connected with the arms 28 and 29 by a pressure lock, whereby each of the arms 28 and 29 is subjected to the effect of pulling members 30, which are moved like a connecting-rod by means of eccentrically disposed discs 30 and 31, respectively. The swinging arm 4 and also the band knife 25, is then in the position shown in FIG. 6 of the drawings. Upon turning the handle 56, the band knife 25 swings into the block 40 of foamy material. By this movement, the curved cutting face 39 is achieved in the block 40 of foamy material (see FIG. 7). The coinciding axis position of the handle 56 and of the swing arm 4, shown in FIG. 7 of the drawings, remains during the following movement into the position shown in FIG. 8 of the drawings, due to the effect of the tension springs 57. Now the swinging of the swing arm 4 upon its pivotal bolt 14 takes place, which bolt engages the abutment 16'', into the position shown in FIG. 8 of the drawings, whereby the band knife 25 performs a cutting face 42 which is of lesser curvature than the cutting face 39. This swinging movement is limited by abutment of the arm 53 on the abutment member 51. In this position the raglan-shoulder pillow 48 is completely cut, thus the band knife 25 left completely the block 40 of foamy material.

Upon further turning of the handle 56 the spring-biased rods 58 and 59 are opened, so that the band knife 25 assumes the opposite cross position, as shown in FIG. 9 of the drawings. During this movement, the band knife does not perform any cut in the material. It merely slides along a cutting face 44, which has been obtained during the previous working cycle.

The block 40 of foamy material is now advanced by means of the operating lever 8 with the help of the feed-drive 3. Then the pivotal point, namely the bolt 14 of the swinging arm 4 is displaced in the guide slot 16, so that the end of the swinging arm engages the abutment 16' as shown in FIG. 10 of the drawings. By swinging the handle 56 in the position to coincide with the axial position of the swinging arm 4 a new curved cut 45 is brought about. Upon termination of the cut 45, the handle 56 remains in the mentioned coinciding axis position. The swinging arm 4 swings then upon its bolt 14, thereby producing the cutting face 46. At the end of the cutting face 46 the arm 52 abuts against the abutment member 50. At this point the second raglan-shoulder pillow 49 has been cut. The band knife 25 which has now left completely the material to be cut, swings now again by operation of the handle 56, so that it moves along the cutting face 39 produced during the previous working cycle and slides completely out of the range of the block 40 of the foamy material.

While I have disclosed one embodiment of the present invention, it is to be understood that this embodiment is given by example only and not in a limiting sense, the scope of the present invention being determined by the objects and the claims.

I claim:

1. A machine for cutting out shoulder pads in a concave section from a block of foamy material, comprising a frame adapted to carry a block of foamy material, means for advancing intermittently said block of foamy material, a pivot member mounted on said frame, a swinging arm, one end of said swinging arm secured to said pivot member for a pivotal movement thereof, through a stroke less than the thickness of said block, stop means for limiting the pivotal movement of said swinging arm in each direction, the other end of said swinging arm carrying a forked member having leg portions, said pivot member being adapted for lateral displacement at the termination of each stroke of said swinging arm, an axle carried between said leg portions and pivotally mounted thereon, means resiliently retaining said axle against pivotal movement with respect to said leg portions, a band-knife projecting from said axle in curved form, said band-knife forming a cutting tool face disposed perpendicularly with respect to a plane defined by said pivot member and said swinging arm, means for oscillating said band-knife about an axis parallel to the cutting tool face, the latter having cutting edges being complementary to one of the curvatures of said shoulder pads disposed opposite each other in the direction of movement of said swinging arm, a handle operatively connected with said axle and adapted to pivot said axle with respect to said forked member about an axis perpendicular to a plane formed by the swinging arm and the oscillating axis of the band-knife, and swinging said band-knife at the start and at the end of each pivotal movement of said swinging arm relative to said forked member when said swinging arm is in engagement with said stop means.

2. The machine, as set forth in claim 1, which includes a slide member secured with its ends to said axle of said forked member, and said band knife reciprocating along said slide member.

3. The machine, as set forth in claim 1, wherein said forked member has a swinging arm and the leg portions of said forked member being disposed in a plane perpendicular to the moving plane of said swinging arm, and bearings formed by the ends of said leg portions, said bearings supporting said axle, and said axle carrying said band knife and drive means for the latter.

4. The machine, as set forth in claim 3, wherein said axle has a projection extending beyond said bearings, said projection being adapted to be connected with a control member.

References Cited in the file of this patent

UNITED STATES PATENTS

| | | |
|---|---|---|
| 35,639 | Trinks et al. | June 17, 1862 |
| 2,015,066 | Cummings | Sept. 24, 1935 |
| 2,129,969 | Showalter | Sept. 13, 1938 |
| 2,201,658 | Whitney | May 21, 1940 |
| 2,381,988 | Shortell | Aug. 14, 1945 |
| 2,417,617 | Schuchardt | Mar. 18, 1947 |
| 2,749,608 | Siemer | June 12, 1956 |
| 2,855,043 | Opferkuch | Oct. 7, 1958 |

FOREIGN PATENTS

| | | |
|---|---|---|
| 713,862 | Great Britain | Aug. 18, 1954 |